US012737234B2

(12) United States Patent
Wiegley

(10) Patent No.: US 12,737,234 B2
(45) Date of Patent: Sep. 15, 2026

(54) DYNAMIC AND PERSISTENT DATA SHARING FOR CLOUD SERVICE PIPELINES

(71) Applicant: Salesforce, Inc., San Francisco, CA (US)

(72) Inventor: Douglas Wiegley, Boise, ID (US)

(73) Assignee: Salesforce, Inc., San Francisco, CA (US)

( * ) Notice: Subject to any disclaimer, the term of this patent is extended or adjusted under 35 U.S.C. 154(b) by 657 days.

(21) Appl. No.: 18/324,939

(22) Filed: May 26, 2023

(65) Prior Publication Data

US 2024/0394113 A1 Nov. 28, 2024

(51) Int. Cl.
*G06F 9/455* (2018.01)
*G06F 9/50* (2006.01)

(52) U.S. Cl.
CPC ........ *G06F 9/5055* (2013.01); *G06F 9/45558* (2013.01); *G06F 2009/4557* (2013.01)

(58) Field of Classification Search
CPC ............... G06F 9/5055; G06F 9/45558; G06F 2009/4557
See application file for complete search history.

(56) References Cited

U.S. PATENT DOCUMENTS 10,484,334 B1 * 11/2019 Lee .......................... H04L 67/30
10,795,550 B1 * 10/2020 Grayson ............... G06F 3/0484
11,392,366 B1 7/2022 Wiegley et al.
11,561,784 B2 1/2023 Wiegley et al.
2022/0217052 A1 * 7/2022 Mutnuru ............. H04L 41/0866
2022/0398070 A1 * 12/2022 Orozco Cervantes .... G06F 8/60

* cited by examiner

*Primary Examiner* — Gregory A Kessler
(74) *Attorney, Agent, or Firm* — Nicholson De Vos Webster & Elliott LLP

(57) ABSTRACT

Apparatus and method for dynamic and persistent data sharing between cloud services. To address limitations in existing systems, resource provisioning and application deployment pipelines are configured with calls to share data using a configuration service. In some implementations, the configuration service includes an API, which is called by one or more stages of the resource provisioning pipeline to write configuration data in key-value pairs (e.g., data related to resource provisioning). One or more stages of the application deployment pipeline are configured with calls to access the configuration data. The stages then use the configuration data for application deployment. The configuration service manages the key-value store using versioning, repeatability, and immutability, to ensures that a configuration generated by any pipeline execution can be automatically re-used by another pipeline, at execution time. Thus, the configuration service is a dynamic, single source of truth for sharing pipeline configuration data.

20 Claims, 7 Drawing Sheets

DYNAMIC AND PERSISTENT DATA SHARING FOR CLOUD SERVICE PIPELINES

TECHNICAL FIELD

One or more implementations relate to the field of computer systems for managing cloud services; and more specifically, to a system and method for dynamic and persistent data sharing between cloud service pipelines, such as infrastructure provisioning pipelines and application deployment pipelines.

BACKGROUND ART

Configuring new services or updating existing services on a cloud-based platform involves two fundamental steps: provisioning cloud infrastructure and deploying software to that infrastructure (e.g., an application). Because the provisioning and deployment pipelines run completely separately, current implementations pass information between them in an ad hoc manner. In many cases, for example, the configuration data of the infrastructure provisioning pipelines (ARNs, URLs, unique IDs) are manually copied into the corresponding application deployment pipelines, so that later invocation of those deployment pipelines can use the provisioned infrastructure. This introduces a human step to the overall deployment process, which creates the possibility of human error, and breaks automation.

In some existing implementations, binary artifacts produced by one pipeline can be consumed by another pipeline. However, this requires the two pipelines to be configured to process the same types of binary artifacts, which limits flexibility. In addition, in some current implementations, one pipeline can directly call a child pipeline and pass information to it. However, this requires a predefined parent-child relationship between the two pipelines, further limiting flexibility.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1A:
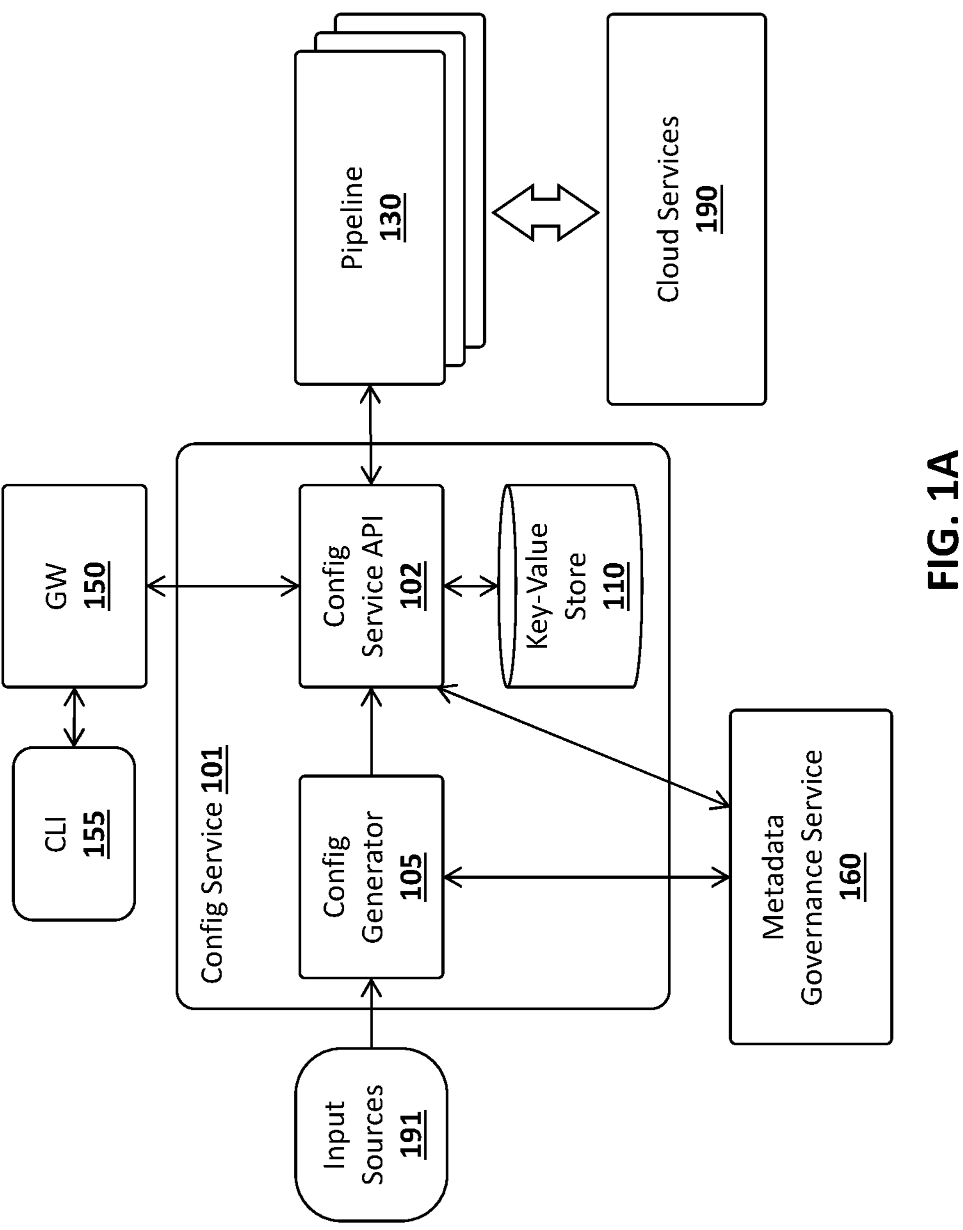
FIG. 1A illustrates an implementation of a configuration service for sharing data between pipelines.

Implementations of the invention described below address the above limitations using a dynamic and persistent data store shared across different types of pipelines, including infrastructure provisioning pipelines and application deployment pipelines. In some implementations, the data store is a key-value store, access to which is directly plumbed into one or more stages of execution pipelines.

As used herein a "pipeline" is a managed sequence of execution stages designed to generate a particular result within a cloud platform. For example, an infrastructure provisioning pipeline comprises a plurality of stages to allocate and configure data processing resources while an application deployment pipeline comprises a plurality of stages to install and configure application services on the data processing resources. In many instances, pipelines are used as a tool to implement strict controls on modifications to a cloud platform. For example, pipelines may enforce strict authentication and versioning requirements and may also generate an audit trail to track the operations which were performed (e.g., so that the changes can be undone if needed). In some implementations, pipelines are managed within one or more continuous delivery (CD) services, although the underlying principles of the invention are not limited to this implementation.

In one particular implementation, calls to the key-value store are integrated within one or more infrastructure provisioning stages of an infrastructure provisioning pipeline to write keys and associated data values (e.g., uniform resource locators (URLs), unique IDs, resource names, etc) to the key-value store. Similarly, one or more execution stages of an application deployment pipeline are configured to include calls to access the key-value pairs and use the associated data values when performing deployment operations.

Significantly, the pipeline consuming the dynamic configuration (e.g., the deployment pipeline in the above example) does not need to be a child pipeline (and thus have information passed to it), nor does a specific binary artifact need to be created and later consumed. The keys of the key-value pairs are directly available and accessible by any pipeline, and can be dynamically read or written directly at the time of execution. While specific details are described below for writing and reading the key-value store, respectively, implementations of the invention may be built with any type of backing store and application programming interface (API) to receive pipeline calls (e.g., REST calls to a REST API).

In at least some implementations, the keys in the key-value store are versioned and immutable. Thus, when a current version of a set of key-value pairs is updated, the current version is preserved and a copy of the current version is updated. The current version and the updated copy may be associated with unique version identifiers (e.g., v1.02 and v1.03, respectively). In some implementations, each time a particular pipeline has completed execution, the resulting set of key-value pairs are preserved as a new version so that they can be reused, even after subsequent updates are performed. Automatically preserving older versions provides the ability to roll-back to a version which is known to be stable, if a more recently updated version is causing issues. In some implementations, all prior versions are maintained in the key-value store until explicitly deleted. In addition, some implementations provide versioning updates to a metadata governance service, which tracks system-wide versioning information and which can be queried to determine versioning information related to the current runtime environment.

Figure 1B:
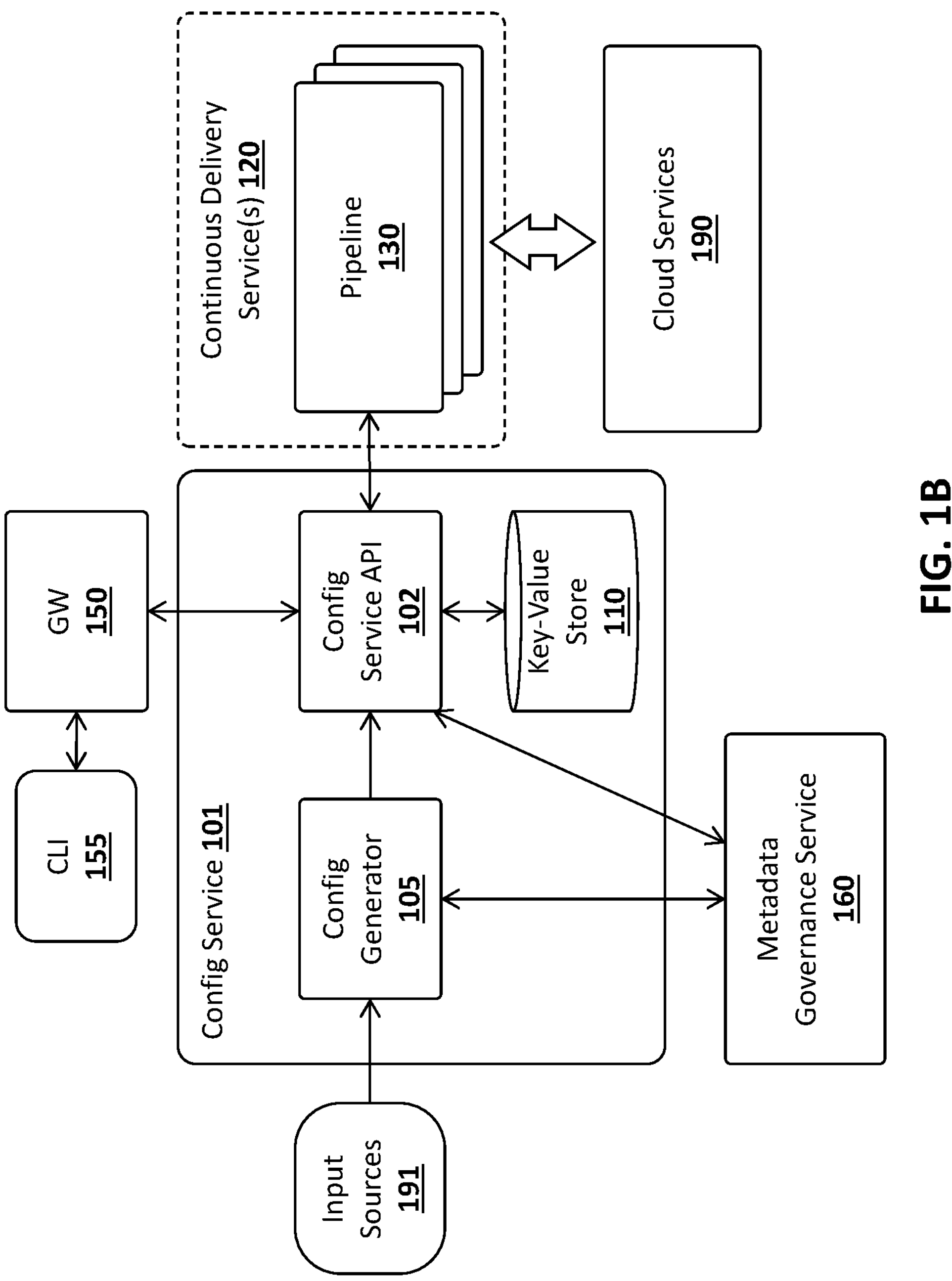
FIG. 1B illustrates an implementation in which one or more pipelines are managed within a continuous delivery (CD) service.

FIGS. 1A-B illustrate implementations of a structured configuration ("config") service 101 with an internally-managed key-value store 110 made accessible to pipelines 130 via a config service API 102. In FIG. 1B, the pipelines 130 are executed within the context of one or more continuous delivery (CD) services 120 (e.g., Spinnakers) to provision resources and/or deploy software on a cloud platform 190. In some examples below, the pipelines 130 include a resource provisioning pipeline for provisioning cloud resources and an application deployment pipeline for deploying applications/services on the provisioned resources. It should be noted, however, that the underlying principles of the invention are not limited to any particular pipelines or any particular type of service for implementing the pipelines. Any type of pipelines 130 can be configured with calls to the config service API 102 to provide access to the key-value store 110 as described herein.

One implementation of the key-value store 110 is a collection of per-target dictionaries, some of which can have specific semantics and/or behaviors attached to them (e.g., where the target can be a particular service, service group, cluster, application, or other entity). For example, the dictionaries used for pipelines are dynamic dictionaries, which can be modified during pipeline execution. In contrast, some dictionaries may be defined as static—i.e., immutable once configured and some may be configured to perform variable interpolation/mapping, to interpret the variables provided in a call to map the variables to the corresponding key-value pairs in the key-value store 110.

One implementation of the config service API 102 comprises a representational state transfer (REST) API which can process commands and generate responses in accordance with JavaScript Object Notation (JSON), although implementations of the invention are not limited to this specific data interchange format. Any database capable of storing different key-value structures may be used for the key-value store 110; however, in one particular implementation, a non-SQL database such as DynamoDB is used. In one implementation, the config service API 102 supports key authentication, such as a combination of Mutual Transport Layer Security (mTLS) and TLS+API.

The key-value pairs in the key-value store 110 can be updated by a config generator 105 and/or in response to calls from one or more stages of the pipelines 130. In one implementation, the config generator 105 is an asynchronous process that generates new per-target config dictionaries based on different input sources 191 including, but not limited to, bill of materials (BOM) modules, static files (e.g., YAML, ConfigMaps), hierarchy inheritance files, and pipeline templates. For example when a BOM for a particular service is updated or a new BOM is implemented, the config generator 105 translates the BOM updates into the corresponding dictionary entries in the key-value store 110.

In some implementations, the config generator 105 and/or config service API 102 may also communicate configuration changes to external entities, such as a metadata governance service 160 (e.g., when a particular database has been updated). For example, the metadata governance service 160 may generate an audit trail which tracks the different versions of the key-value store in use for provisioning and/or deployment, and may associate these versions with other relevant types of data (e.g., runtime metrics, resource consumption data, reliability metrics, etc). Thus, if there is an issue associated with a recently updated version, the metadata governance service 160 may be queried to identify a prior version of the key-value data to apply to the associated service(s).

In some implementations, a gateway 150 provides access to the config service API 107 from a command line interface (CLI) 155 or other type of user interface. The CLI 155 may be used, for example, by an administrator or other authorized user to view and/or manually update configuration data in the key-value store 110.

Figure 2:
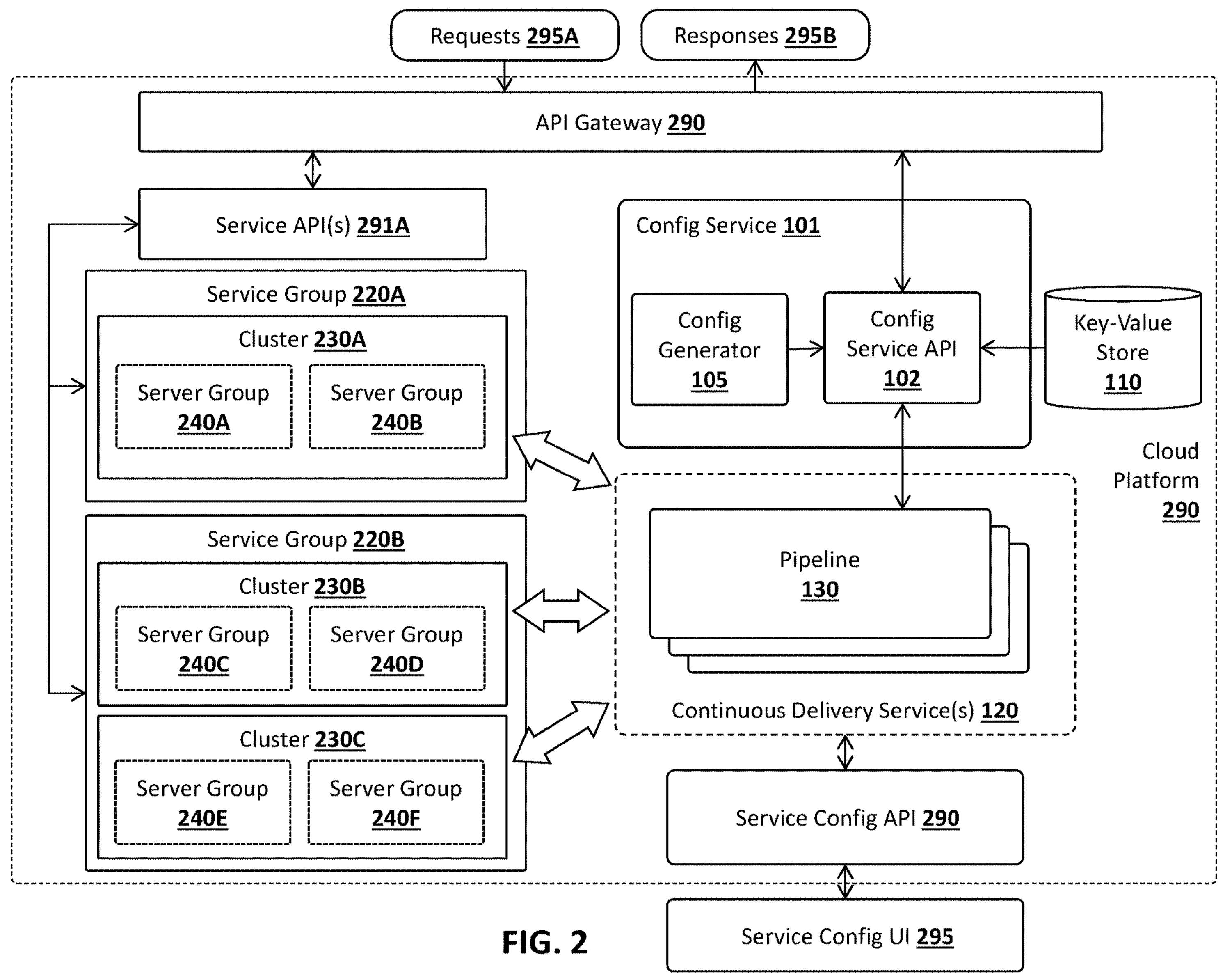
FIG. 2 illustrates a cloud platform architecture in accordance with some implementations.

FIG. 2 illustrates an example set of resources of a cloud platform 290 including two service groups 220A-B configurable by pipelines 130 of a continuous delivery service 120. As used herein, a "cloud" platform 290 provides resources, software, and information to computers and other electronic devices upon request. In cloud environments, software can be accessible over the internet rather than installed on local computer systems. Software on a cloud platform 290 may be functionally organized into distinct services (e.g., supported by one or more service groups 220A-B). Cloud services typically involve on-demand, over-the-internet provision of dynamically scalable and often virtualized resources. Technological details can be abstracted from the users, who no longer need expertise in, or control over, the technology infrastructure "in the cloud" that supports them.

"Continuous delivery" (CD), as implemented by CD service 120, is an approach to software development allowing teams to produce software in short cycles, ensuring that the software can be reliably released at any time through a production-like pipeline. The CD approach reduces the cost, time, and risk of delivering changes by allowing for more incremental updates to applications in production. A straightforward and repeatable process embodied in one or more pipelines 130 is important for continuous delivery. Both the resource provisioning pipelines and the application deployment pipelines described herein may be executed within the context of one or more continuous delivery services 120.

As mentioned, service groups 220A-B on the cloud platform 290 may implement one or more services. In the example illustrated in FIG. 2, service group 220A includes cluster 230A with two server groups 240A-B and service group 220B includes a first cluster 230B with server groups 240C-D and a second cluster 230C with server groups 240E-F. The cloud services provided by each service group 220A-B are accessible via one or more service API(s) 291A. In operation, service requests 295A are routed by API gateway 290 to a corresponding service group 220A-B and one or more servers of the server groups 240A-F process the requests 295A and generate responses 295B.

In some implementations, each service group 220A-B provides a set of capabilities and features encoded in software (e.g., business logic, APIs, data interfaces, etc) that can be delivered and operated independently, as a single cohesive unit. A service group can also be referred to as a logical service group, a functional unit, or a bounded context. Each service group 220A-B may also be viewed a set of services with interconnected technical use-case functionalities provided on one or more computing systems (e.g., servers of server groups 240A-F). Each service group 220A-B may also define a scope for modifications to the service. Thus, any modifications to an entity, such as a capability, feature, or service offered by one or more computing systems within a service group 220A-B (e.g., updates to servers within server groups 240A-F) are propagated to other entities within the service group, but does not propagate to entities residing outside the bounded definition of the service group 220A-B.

In some implementations, each pipeline 130 performs a defined set of operations such as resource provisioning and service deployment updates within the context of a service group 220A-B. For example, a particular execution of a pipeline 130 may target updates to service group 220B (e.g., performing code updates to the software on servers within server groups 240C-D of cluster 230B and server groups 240E-F of cluster 230C) without affecting service group 220A, and vice versa. It should be noted, however, that the underlying principles of the invention are not limited to any particular granularity for updating cloud services.

In one implementation, each cluster 230A-C within a service group provides load balancing functionality which distributes the load on servers within each server group 240A-F. For example, cluster 230B may alternate between servers in server group 240C and servers in server group 240D to process incoming requests 259A, distributing the load evenly across the underlying servers and associated resources within the two server groups 240C-D.

In some implementations, a service configuration API 290 provides access to the continuous delivery service 120 from external entities, including a service configuration user interface (UI) 295 (e.g., a command line interface or graphical user interface) which translates user input into API commands processed by the service configuration API 290 to control and configure the pipelines 130 within the continuous delivery service 120.

Figure 3:
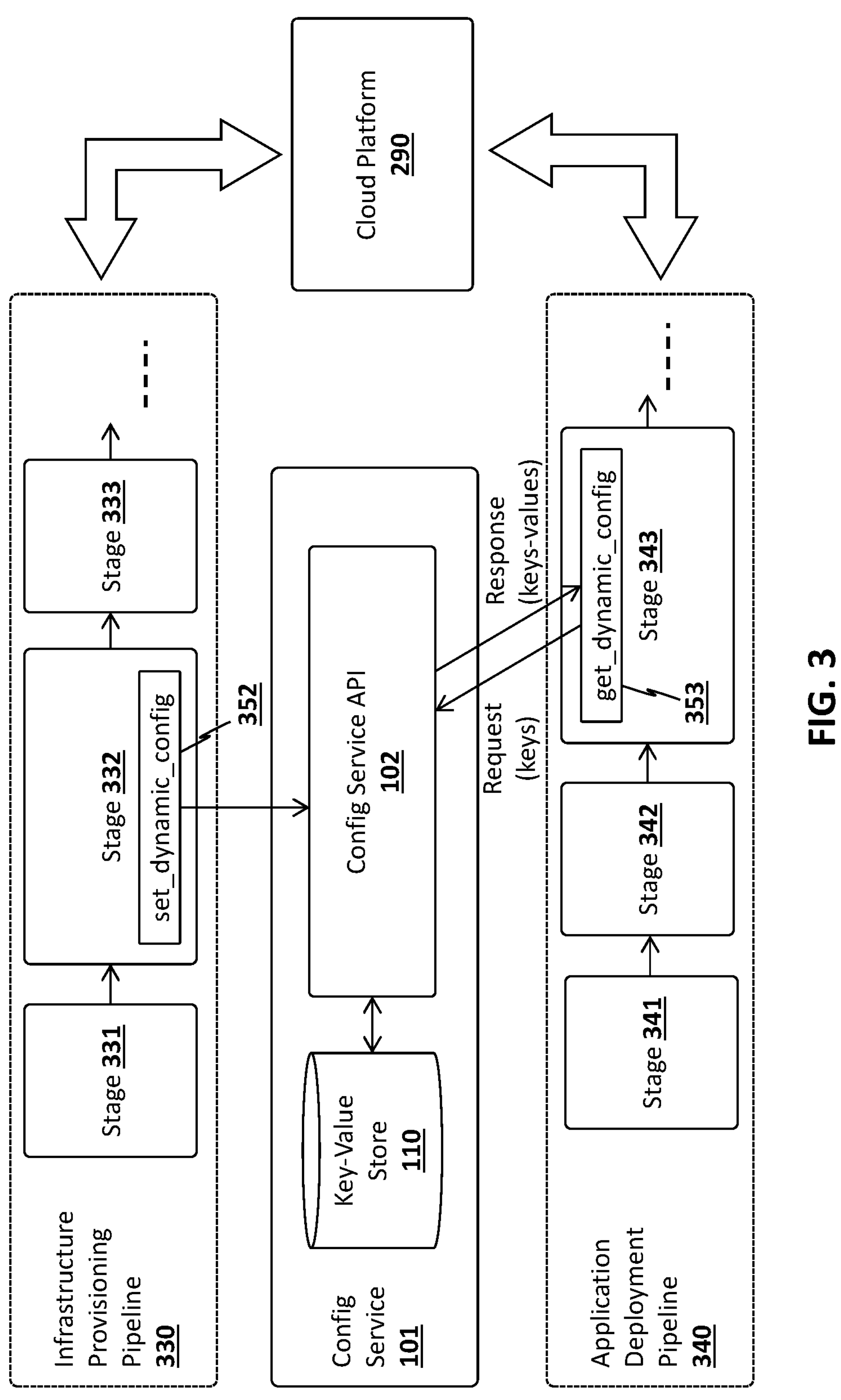
FIG. 3 illustrates two pipelines sharing configuration data via one implementation of a configuration service.

FIG. 3 illustrates one implementation of a set of interactions between an infrastructure provisioning pipeline 330, the config service 101 and an application deployment pipeline 340. Stages 331-333 of the infrastructure provisioning pipeline 330 provision resources within cloud platform 290. For a virtual-machine (VM)-based implementation, for example, one or more of the stages 331-333 provisions VM instances in groups from templates, persistent disks, object stores, and/or network resources. For container-based implementations, one or more of the stages 331-333 provisions clusters of server groups (e.g., clusters 230A-C and server groups 240A-F), and other required resources. Once provisioning is complete, stages 341-343 of the application deployment pipeline 340 perform operations to deploy application program code on the provisioned resources (e.g., services and associated APIs).

Calls to write or read data to or from the key-value store 110, respectively, may be plumbed into any of the stages 331-333 of the infrastructure provisioning pipeline 330 and/or any of the stages 341-343 of the application deployment pipeline 340. In the illustrated example, a set_dynamic_config call 352 is performed at stage 332 of the infrastructure provisioning pipeline 330. When processed by the config service API 102, set_dynamic_config (Key, Value) causes the specified Key-Value pair to be written to the key-value store 110. In some implementations, multiple keys and corresponding values may be specified in a single set_dynamic_config call (e.g., set_dynamic_config ("key1", "value1"; "key2", "value2, etc)).

A get_dynamic_config call 353 is included in stage 343 of the application deployment pipeline 340 to request current values associated with one or more keys. For example, when processed by the config service API 102, get_dynamic_config (Key) causes the value associated with the specified Key to be read from the key-value store 110. The value is returned by the config service API 102, allowing the calling stage 343 to perform deployment operations using configuration data which is consistent with that used by the infrastructure provisioning pipeline 330.

In some implementations, the keys are strings (e.g., "favorite-editor") and the values comprise any data types supported by the platform, including but not limited to strings, integer values, and Boolean values. A value may be specified using any defined data type (e.g., any JavaScript Object Notation (JSON) data type).

In some implementations, the various calls to the key-value store 110 (e.g., calls 352-535 in FIG. 3) are formatted in accordance with an expression language which supports querying and manipulating object graphs at runtime. In one particular implementation, the Spring Expression Language ("SpEL") is used, although the underlying principles of the invention are not limited to this implementation. With SpEL, the call set_dynamic_config may have the following format:

```
{% set_dynamic_config("favorite-editor",
    "emacs"%}.
```

where favorite-editor is a key and emacs is the corresponding value. A corresponding get_dynamic_config call may have the format:

```
editor: {% get__dynamic__config(
  "favorite-editor",
  pipeline="provision-service") %}.
```

One implementation of the config service API 102 processes the set_dynamic_config call to write the "emacs" value for the "favorite-editor" key in the key-value store 110. The config service API 102 subsequently processes the get_dynamic_config call to form a database query using the "favorite-editor" key to read the associated "emacs" value. In this example, the identity of the service which set the value (i.e., pipeline="provision-service") is also provided, and may be used to differentiate between different sets of key-value data. For example, different sets of key-value data may be stored for different services (e.g., in per-service dictionaries as described below). Various expression languages may be used in addition to SpEL including, but not limited to, the Object Graph Navigation Language (OGNL), MVFlex Expression Language (MVEL), and JBoss Expression Language (EL), to name a few.

One implementation utilizes the following new expressions callable from any pipeline or CD service at execution time:

ConfigApi: In one implementation, the configApi function accepts three arguments: an HTTP method, a URL path, and a payload. The URL path is relative to a base config service API endpoint provided as part of the pipeline's or CD service's SpEL configuration. The payload is a JSON map that is encoded as URL parameters on GET operations or request body on POST or SET operations. This expression can be used to read or write from the config service API 102.

ConfigApiOrDefault: This expression is very similar to the configApi expression except that it takes a fourth argument for a default value in case the requested key is not found.

MergeMaps: This expression recursively merges two key-value mappings. If there is an overlap (e.g., the same key with two different values), then one of the two maps (e.g., the second map) takes precedence over the first. By way of example, and not limitation, MergeMaps can be used to combine user-provided pipeline parameters with per-service or per-target dictionaries fetched from the config service API 102.

As mentioned, the key-value data may be managed within a set of structured per-entity dictionaries (e.g., per-target, per-service, per-cluster, etc) some of which have specific semantics and behaviors attached to them. Thus, the dictionaries are "sources", which are automatically expanded and published per-entity (e.g., as updates are made to the corresponding configuration data). The input sources 191 are flexible, as long as the set of dictionaries is in the format that the structured config service 101 can interpret. In some implementations, the config generator 105 extracts the data provided from the input sources 191 in various formats, translating it into a key-value dictionary format in the key-value store 110.

In some implementations, the schema for a "key" comprises a pair of keys: a primary key and a secondary range key. The primary "key" is the hash key, used by the config service API 102 to perform queries in the key-value store 110 as described herein. The secondary range key is a timestamped epoch value (e.g., a Unix epoch with microsecond granularity). In one implementation, versioning of the key-value pairs is performed using the two key types. For example, edits to existing keys are not allowed (i.e., the keys are immutable), but the same key may be reinserted into the key-value store 110, but with a new epoch value. Thus, in this implementation, the epoch value is used as the "version" identifier for that key. Any epoch value can represent the "config version" for an entire service, as any GET request including a key will cause the config service API 102 to search for keys with a range value less than or equal to the "version", based on the epoch value. Within these constraints, enforced by the config service API 102, key values are versioned and immutable.

In some implementations, typed dictionaries will be automatically inserted in the key-value store 110 for their various tasks. While pipelines 130 can query any dictionary automatically, at execution time, one implementation of the config service API 102 will not accept dynamic queries during a service's or other application's runtime. Rather, this data is only exported to the service/application during a pipeline execution (e.g., the application deployment pipeline 340). For applications that need access to one or more of their keys during application runtime, some implementations can use configuration maps (e.g., k8s ConfigMap's) which can be added to the corresponding cluster or file system mounts with the required configuration keys in text files.

Some GET operations may result in multiple queries by the config service API 102 to the key-value store 110. For example, when a pipeline is shared between different entities, pipeline parameter override lookups may be performed in which the config service API 102 first checks the first entity's team/service name for overrides and then checks the second entity's team/service name for overrides—i.e., where the overrides of the first entity may take priority over the overrides of the second entity (or vice versa). By way of example, and not limitation, the first entity may be the parent pipeline's team/service and the second entity may be the pipeline owner's team/service.

In one implementation, if a lookup to the key-value store 110 fails, the config service API 102 will look for more generic "default" values associated with the target. For example, if the config service API 102 unsuccessfully attempts to find a key for the target "FI-FD-CELL-SI1", it will look in parallel for a matching key under " ", "FI", "FI-FD", and "FI-FD-CELL", and use the most specific match found, if any. This behavior allows looking up default values for new FI/FD/cell builds.

Figure 4:
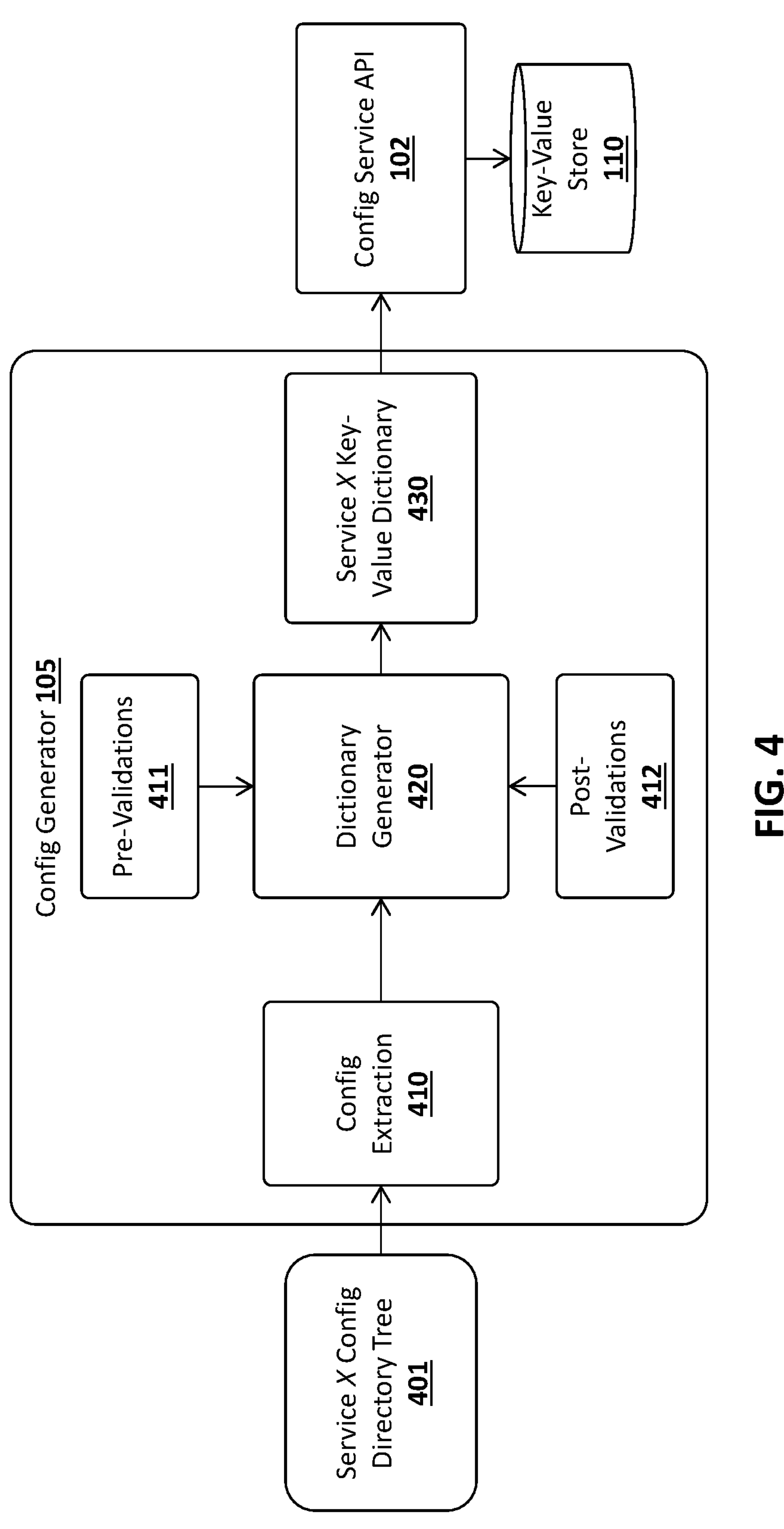
FIG. 4 illustrates one implementation of a config generator for generating a target-specific dictionary.

As mentioned, the config generator 105 generates new per-target config dictionaries based on different input sources 191. FIG. 4 illustrates an implementation in which one of the input sources is a config directory tree 401 for a particular service (service X). The config directory tree 401 comprises a hierarchical tree defining the identity and hierarchical relationship of the various software components and configuration settings for the service. In the illustrated implementation, configuration extraction logic 410 of the config generator 105 parses the config directory tree 401 to extract the configuration data. For example, the configuration extraction logic 401 may identify directories in the tree which contain configuration files which it provides to a dictionary generator 420.

The dictionary generator 420 applies any customer supplied pre-validations 411, reads the configuration files and verifies the basic file-format syntax (e.g., for JSON, YAML, TOML, etc). The dictionary generator 420 then applies shell-style variable interpolation to the file contents, mapping the configuration data to a set of key-value pairs, and implementing any inheritance rules and customizations. After applying any customer supplied post-validations 412, the dictionary generator 420 generates the key-value dictionary 430 associated with service X, which it stores in the key-value store via the config service API 102.

Figure 5:
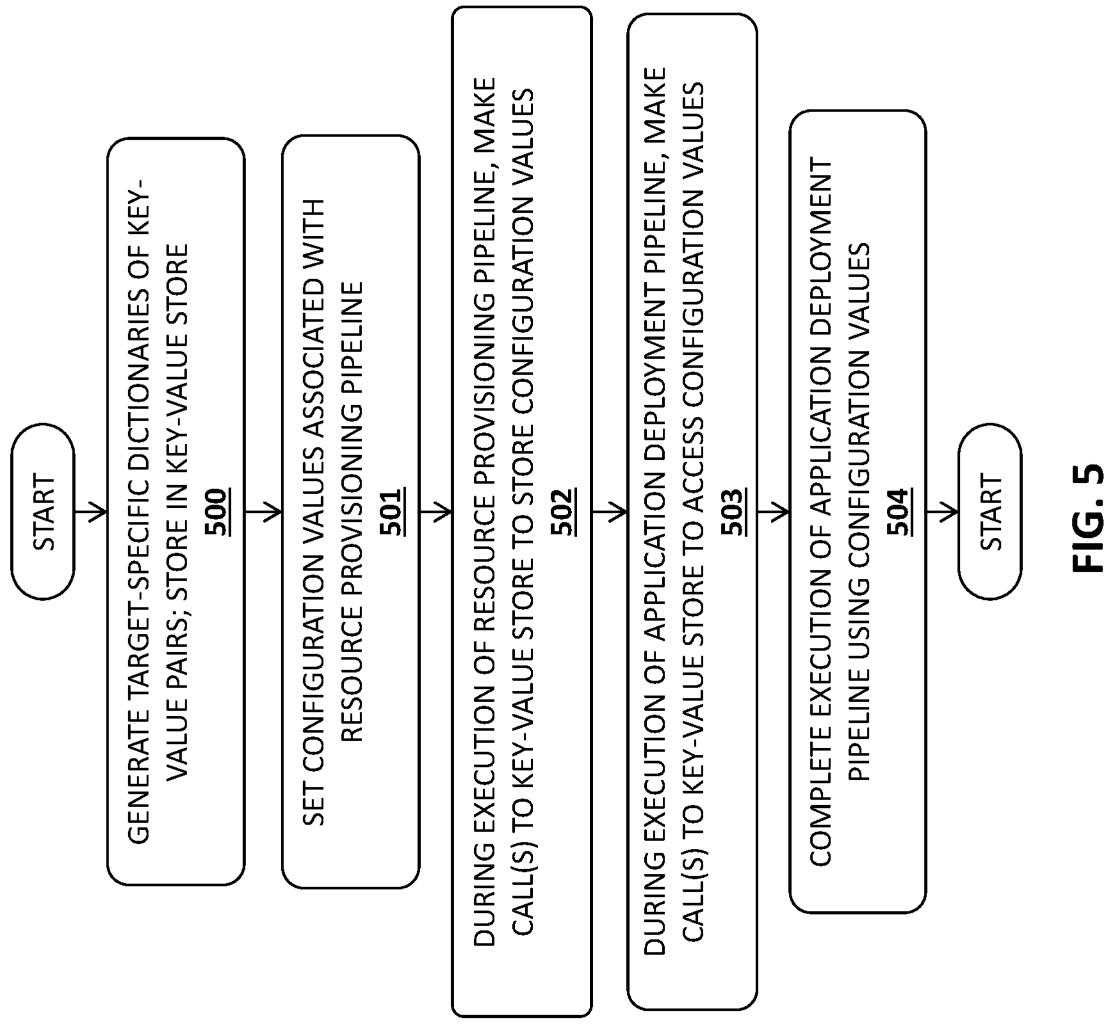
FIG. 5 illustrates a method in accordance with some implementations.

A method in accordance with one implementation is illustrated in FIG. 5. The method may be performed within the context of the various architectures described herein, but is not limited to any particular architecture.

At 500 one or more target-specific dictionaries of key-value pairs are generated and stored in a key-value store. For example, as described with respect to FIG. 4, the directory tree of a particular service may be processed to extract and store the configuration data as key-value pairs in a service-specific dictionary.

At 501, one or more configuration values associated with a resource provisioning pipeline are set. At 502, during execution of the stages of the resource provisioning pipeline, one or more calls are made to the key-value store (e.g., via an API) to store the one or more configuration values.

At 503, during execution of an application deployment pipeline, calls are made dynamically to the key-value store to retrieve the configuration values. As mentioned, the calls (e.g., get_dyamic_config) may be integrated within one or more stages of the application deployment pipeline. At 504, execution of the application deployment pipeline is completed using the configuration values read from the key-value store.

Implementations of the invention provide a dynamic, single source of truth for sharing configuration data between separate and independent pipelines. The key-value store is managed using versioning, repeatability, and immutability to ensure that a configuration generated by any pipeline execution can be automatically and dynamically re-used by another pipeline at execution time. These implementations provide significant improvements over existing implementations which require manual copying of binary artifacts from one pipeline to another or requiring a hierarchically defined relationship between the pipelines.

As used herein, a container-orchestration system (COS) automates deployment, scaling and management of containerized applications (also referred to as containerized software and containerized apps); in other words, it provides a platform for automating deployment, scaling, and operations of application containers across clusters of hosts. For example, Kubernetes is a COS that works with a range of container tools, including those provided by Docker, Inc. Another example of a COS is Docker Swarm. A container is a self-contained execution environment, such as a Linux execution environment; in other words, a container is a standard unit of software that packages up code and all its dependencies, so that the application runs quickly and reliably regardless of its computing environment. A container image is used to create one or more containers at runtime. A container image is a lightweight, standalone, executable package of software that includes everything needed to run an application: code, runtime, system tools, system libraries and settings (e.g., a Docker container image becomes a Docker container when it is run on Docker Engine; another container engine is Rkt).

With regard to hardware, a COS may include: 1) nodes (also referred to herein as COS nodes), where a node is a representation of a single machine in a COS cluster, where that single machine can be a physical machine in a datacenter or virtual machine hosted on a cloud provider; 2) clusters (also referred to herein as COS clusters), where a cluster represents a more powerful machine resulting from pooling the resources (processors and memory) of the nodes within the cluster; and 3) persistent volumes (a persistent volume is a file system that can be mounted to the cluster, without being associated with any particular node; while traditional local storage associated to each node is treated as a temporary cache to hold programs and data).

With regard to software, a COS may include: 1) containers (also referred to as COS containers, Docker containers, etc.); 2) pods (also referred to herein as "replicas," "COS pods," or "kpods" in a Kubernetes implementation), where a pod is the unit of replication and wraps one or more containers that will share the same resources and local network; 3) deployments, where a deployment manages a pod, including declaring the number of replicas of the pod and monitoring the pods; and 4) ingress, where an ingress refers to a communication channel between a service running in a pod and the outside world, and is typically either an ingress controller, a load balancer, or Kube-proxy (a combination of a network proxy and a load balancer). In addition, a COS has support for an abstraction (e.g., a Kubernetes Service) that defines a logical set of pods and a policy by which to access them (sometimes called a micro-service), as well as an API (e.g., Kubernetes Endpoints API) so that the service provided by one such abstraction can call the service provided by another such abstraction.

In operation, a COS cluster of nodes is formed and a set of one or more persistent volumes is attached to that cluster. Then, a COS deployment is launched onto the cluster. The COS deployment causes the spinning up and monitoring of the declared number of COS pods. Spinning up a COS pod includes executing the containerized application(s) specified in the container image(s) identified for that COS pod.

A COS typically includes a COS controller to control operation of the COS. A COS controller can receive an operation according to configuration information (sometimes referred to as a manifest, an "API object description," or "application configuration information") that describes the desired state of an application in terms of COS constructs.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing"

(and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6B:
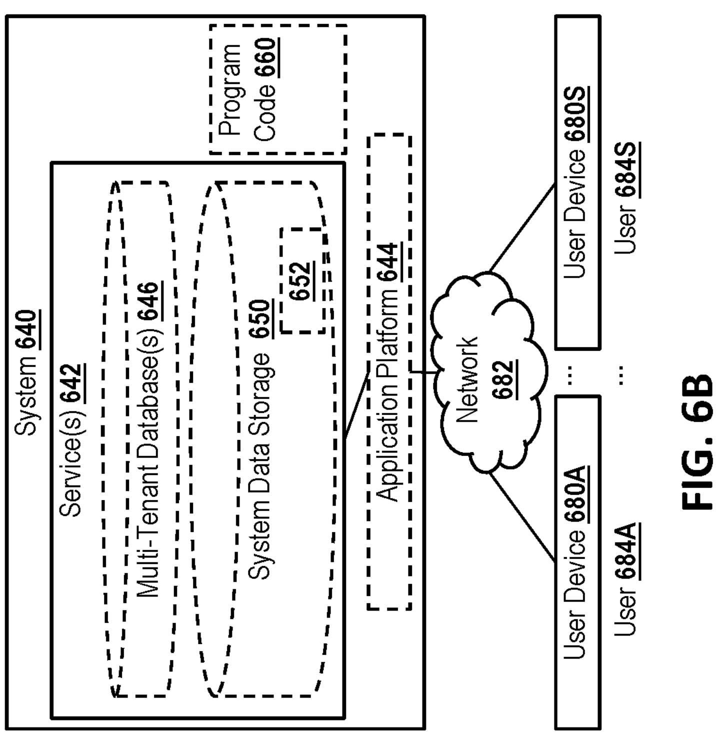
FIG. 6B illustrates one implementation of a system.
Figure 6A:
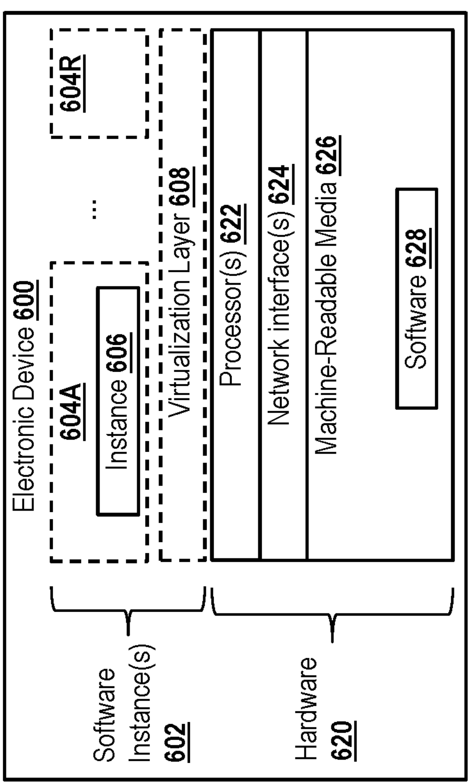
FIG. 6A illustrates one implementation of an electronic device.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described service groups 220A-B, clusters 230A-C, and/or server groups 240A-F may be implemented in one or more electronic devices 600. In one implementation each instance of a service (e.g., config service 101, CD service 120) is implemented in at least one of the electronic devices 600 (e.g., software 628 represents a web browser, a native client, a portal, a command-line interface, and/or an application programming interface (API) based upon protocols such as Simple Object Access Protocol (SOAP), Representational State Transfer (REST), etc.); and in operation, the electronic devices implementing the instances are communicatively coupled over a network or high speed interconnect fabric to one another.

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Example Environment

FIG. 6B is a block diagram of a deployment environment according to some example implementations. A system 640 includes hardware (e.g., a set of one or more server devices) and software to provide service(s) 642, including the CD service 120 and config service 101. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs, such as the config service API 102 described above (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: Configuration; Continuous delivery (CD); Pricing; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Cache-as-a-Service (CaaS); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. In some implementations, the program code 660 may form at least a portion of the continuous delivery service 120 and the config service 101. Further, in one implementation, the application platform 644 includes an application setup mechanism that supports application developers' creation and management of applications, which may be saved as metadata by save routines. Invocations to such applications may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. For example, while a specific set of resource provisioning and application deployment pipelines are described, various other pipelines may be executed in accordance with the implementations described herein. Furthermore, the specific architecture shown in FIG. 2 are not required for complying with the underlying principles of the invention.

What is claimed is:

1. An article of manufacture comprising a non-transitory machine-readable storage medium that provides instructions that, if executed by one or more electronic devices, are configurable to cause the one or more electronic devices to perform operations comprising:

setting a plurality of configuration values associated with a resource provisioning pipeline;

executing resource provisioning stages of the resource provisioning pipeline in accordance with the plurality of configuration values to provision resources of a cloud platform;

making a first call to a configuration service comprising a key-value store during execution of one or more of the resource provisioning stages to cause the configuration service to store the plurality of configuration values to the key-value store;

executing application deployment stages of an application deployment pipeline to deploy application program code on the resources provisioned by the resource provisioning pipeline; and making a second call to the configuration service during execution of one or more of the application deployment stages to cause the configuration service to provide one or more of the plurality of configuration values from the key-value store, the one or more of the plurality of configuration values to be used by the one or more application deployment stages.

2. The article of manufacture of claim 1 wherein the resources provisioned by one or more of the resource provisioning stages comprise one or more server groups, one or more clusters of the server groups, and/or one or more service groups comprising the clusters.

3. The article of manufacture of claim 1 wherein for a virtual machine (VM)-based implementation, the resources provisioned by one or more of the resource provisioning stages further comprise one or more VM instances provisioned from templates, persistent disks, object stores, and/or network resources.

4. The article of manufacture of claim 1 wherein a first command is to be transmitted to the configuration service responsive to the first call and a second command is to be transmitted to the configuration service responsive to the second call, the first and second commands supported by an application programming interface (API) of the configuration service.

5. The article of manufacture of claim 4 wherein the first command comprises a plurality of key-value pairs corresponding to the plurality of configuration values and the second command comprises a plurality of keys to be used by the API of configuration service to query the key-value data store and access the corresponding plurality of configuration values.

6. The article of manufacture of claim 5 wherein at least one of the resource provisioning pipeline and the application deployment pipeline are to be managed within a continuous delivery (CD) service, the CD service to transmit at least one of the first command and the second command to the configuration service in accordance with the first call and the second call, respectively.

7. The article of manufacture of claim 1 wherein based on the first call, the configuration service is to generate a new version of the key-value store or relevant portion thereof, the new version to include the plurality of configuration values associated with the first call, the configuration service to maintain a prior version of the key-value store or relevant portion thereof, which does not include the plurality of configuration values.

8. The article of manufacture of claim 7 wherein the configuration service is to assign a first version identifier to uniquely identify the prior version of the key-value store or relevant portion thereof, and is to assign a second version identifier to uniquely identify the new version of the key-value store or relevant portion thereof.

9. The article of manufacture of claim 1 wherein the configuration service is to initially populate the key-value store with one or more service-specific dictionaries, the configuration service to extract configuration data from a directory tree of a service and to map the configuration data to key-value pairs to construct a service-specific dictionary.

10. The article of manufacture of claim 9 wherein the service-specific dictionary is to be stored in the key-value store and updated responsive to calls from the resource provisioning pipeline, the application deployment pipeline, or one or more other pipelines.

11. A method implemented in a set of one or more electronic devices, the method comprising:

setting a plurality of configuration values associated with a resource provisioning pipeline;

executing resource provisioning stages of the resource provisioning pipeline in accordance with the plurality of configuration values to provision resources of a cloud platform;

making a first call to a configuration service comprising a key-value store during execution of one or more of the resource provisioning stages to cause the configuration service to store the plurality of configuration values to the key-value store;

executing application deployment stages of an application deployment pipeline to deploy application program code on the resources provisioned by the resource provisioning pipeline; and making a second call to the configuration service during execution of one or more of the application deployment stages to cause the configuration service to provide one or more of the plurality of configuration values from the key-value store, the one or more of the plurality of configuration values to be used by the one or more application deployment stages.

12. The method of claim 11 wherein the resources provisioned by one or more of the resource provisioning stages comprise one or more server groups, one or more clusters of the server groups, and/or one or more service groups comprising the clusters.

13. The method of claim 11 wherein for a virtual machine (VM)-based implementation, the resources provisioned by one or more of the resource provisioning stages further comprise one or more VM instances provisioned from templates, persistent disks, object stores, and/or network resources.

14. The method of claim 11 wherein a first command is to be transmitted to the configuration service responsive to the first call and a second command is to be transmitted to the configuration service responsive to the second call, the first and second commands supported by an application programming interface (API) of the configuration service.

15. The method of claim 14 wherein the first command comprises a plurality of key-value pairs corresponding to the plurality of configuration values and the second command comprises a plurality of keys to be used by the API of configuration service to query the key-value data store and access the corresponding plurality of configuration values.

16. The method of claim 15 wherein at least one of the resource provisioning pipeline and the application deployment pipeline are to be managed within a continuous delivery (CD) service, the CD service to transmit at least one of the first command and the second command to the configuration service in accordance with the first call and the second call, respectively.

17. The method of claim 11 wherein based on the first call, the configuration service is to generate a new version of the key-value store or relevant portion thereof, the new version to include the plurality of configuration values associated with the first call, the configuration service to maintain a prior version of the key-value store or relevant portion thereof, which does not include the plurality of configuration values.

18. The method of claim 17 wherein the configuration service is to assign a first version identifier to uniquely identify the prior version of the key-value store or relevant portion thereof, and is to assign a second version identifier to uniquely identify the new version of the key-value store or relevant portion thereof.

19. The method of claim 11 wherein the configuration service is to initially populate the key-value store with one or more service-specific dictionaries, the configuration service to extract configuration data from a directory tree of a service and to map the configuration data to key-value pairs to construct a service-specific dictionary.

20. The method of claim 19 wherein the service-specific dictionary is to be stored in the key-value store and updated responsive to calls from the resource provisioning pipeline, the application deployment pipeline, or one or more other pipelines.

* * * * *